United States Patent [19]

Bier

[11] Patent Number: 5,442,788
[45] Date of Patent: Aug. 15, 1995

[54] METHOD AND APPARATUS FOR INTERFACING A PLURALITY OF USERS TO A PLURALITY OF APPLICATIONS ON A COMMON DISPLAY DEVICE

[75] Inventor: Eric A. Bier, Mountain View, Calif.

[73] Assignee: Xerox Corporation, Stamford, Conn.

[21] Appl. No.: 974,036

[22] Filed: Nov. 10, 1992

[51] Int. Cl.[6] .......................... G06F 9/22; G06F 3/14
[52] U.S. Cl. .................................. 395/650; 395/158;
364/228; 364/229.5; 364/243.5; 364/243;
364/231.5; 364/271; 364/DIG. 1
[58] Field of Search ................. 395/DIG. 1, 900, 425;
364/DIG. 1, DIG. II

[56] References Cited

U.S. PATENT DOCUMENTS

| | | | |
|---|---|---|---|
| 5,008,853 | 4/1991 | Bly et al. | 364/900 |
| 5,072,412 | 12/1991 | Henderson et al. | 395/159 |
| 5,220,657 | 6/1993 | Bly et al. | 395/425 |
| 5,233,687 | 8/1993 | Henderson et al. | 395/158 |

OTHER PUBLICATIONS

Bier, E. A. et al. "MMM: A User Interface Architecture for Shared Editors on a Single Screen," *Proceedings of the ACM Symposium on User Interface Software and Technology*, Nov. 11-13, 1991, p. 79.

Primary Examiner—Kevin A. Kriess
Assistant Examiner—Majid A. Banankhah
Attorney, Agent, or Firm—Rosen, Dainow & Jacobs

[57] ABSTRACT

A multi-user multi-device system enables a plurality of users to control a single screen. Each user has one or more input devices, which can be used to control one or more stored applications. At any time, the system produces a consistent view of all applications on the single screen. The input from each user produces a response customized to the preferences of that user. Each user can inform the system of which devices that user is using. Inputs to the system initiate the building of Event Records that are queued and then directed to specific applications. The screen is updated, and the coordinates of child applications are determined, only during pauses in the operations of all applications.

9 Claims, 13 Drawing Sheets

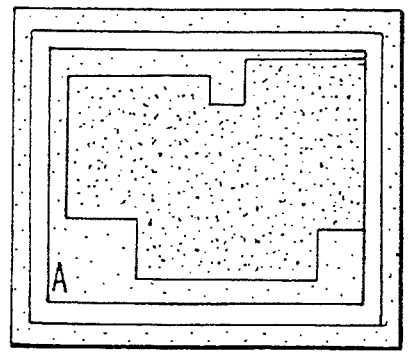
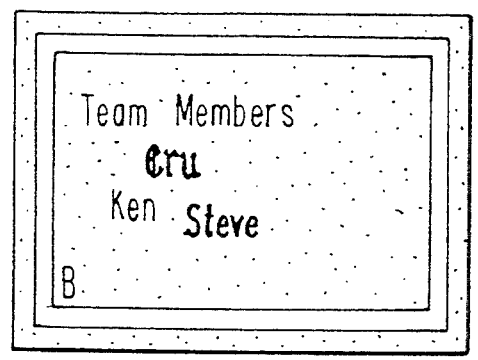
FIG. 4    FIG. 5
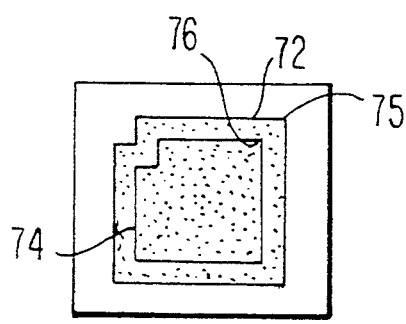
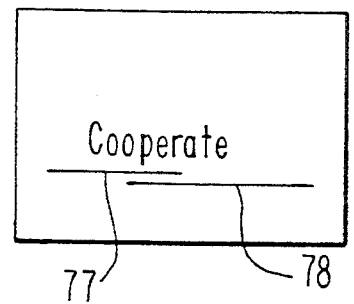
FIG. 10    FIG. 11
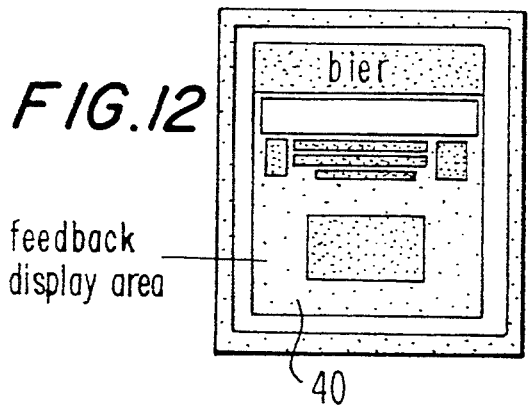
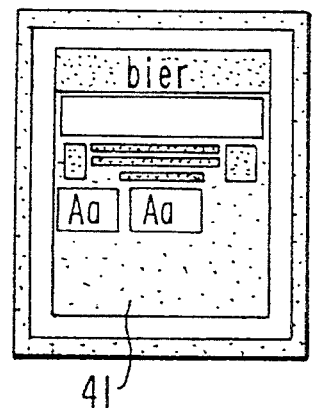
FIG. 12    FIG. 13

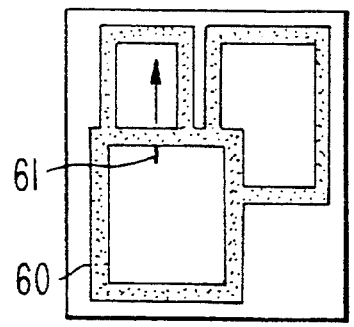
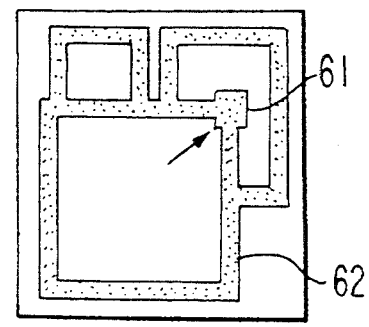
FIG.6　　　　FIG.7
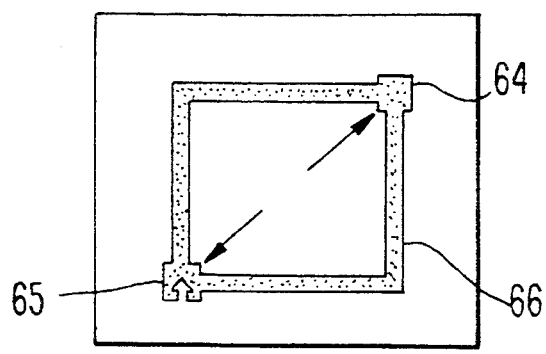
FIG.8
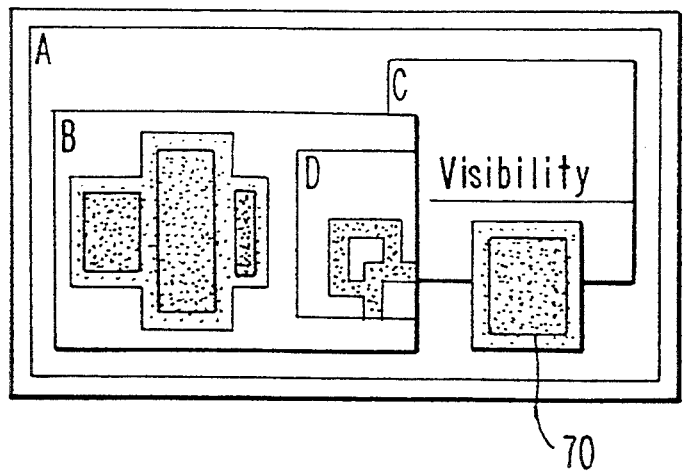
FIG.9

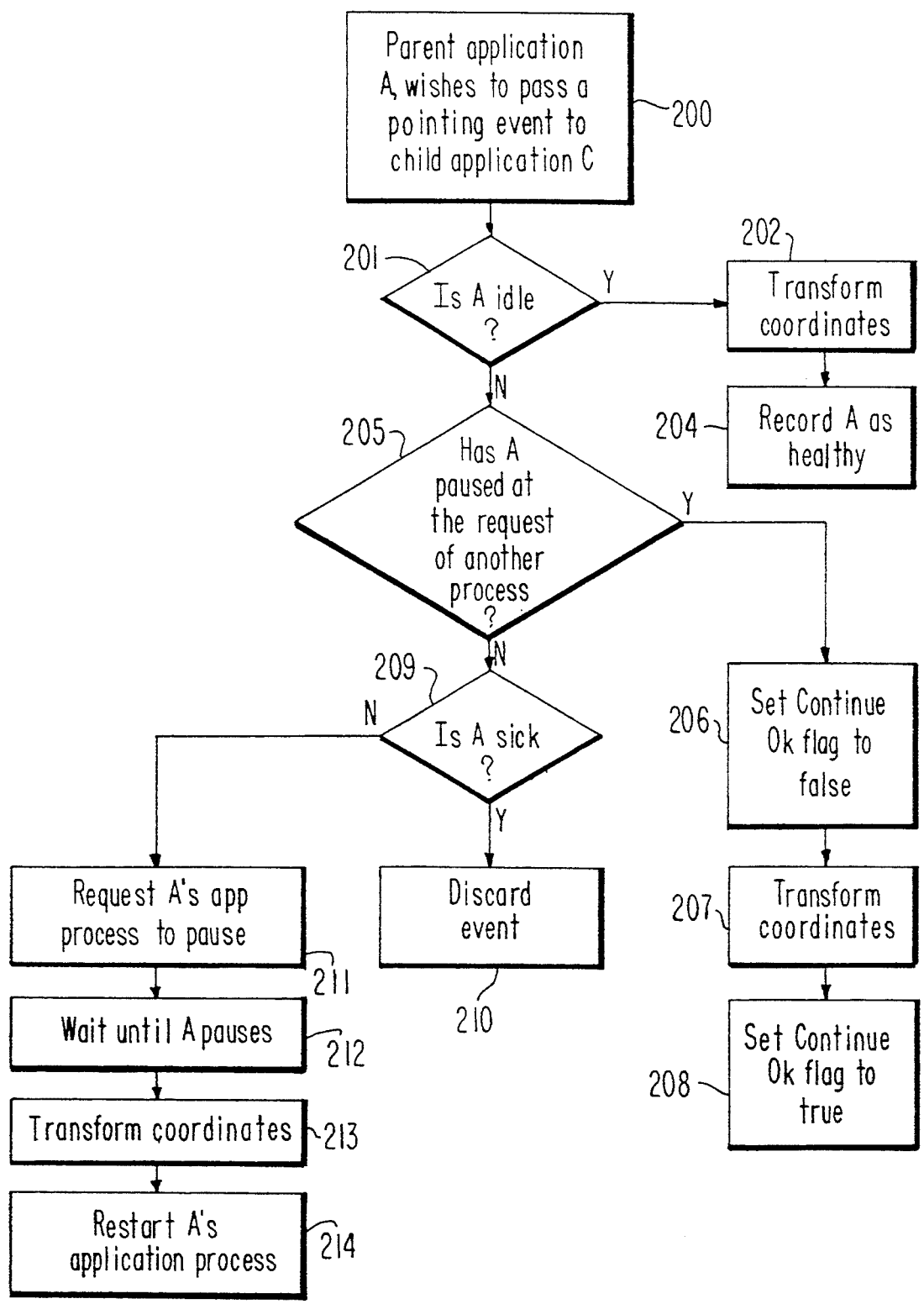

METHOD AND APPARATUS FOR INTERFACING A PLURALITY OF USERS TO A PLURALITY OF APPLICATIONS ON A COMMON DISPLAY DEVICE

FIELD OF THE INVENTION

This invention relates to a method and apparatus for enabling a plurality of users to share a single display of a computer system. The invention is related to the disclosure of copending U.S. patent application Ser. No. (Attorney Docket D/92142-XRX134) filed on the same day as the present application, the contents of which are incorporated by reference herein.

BACKGROUND OF THE INVENTION

Many modern groupware applications generally require that each of a number of participants have his or her own computer. There are many occasions, however, in which two or more people wish to collaborate in a single-computer situation. This may occur, for example, when one person visits another's office, or when two or more people are using a large-screen computer, such as a Xerox Liveboard.

Many groupware computer systems do not provide any facilities for per-user customization. Those that do usually take advantage of the fact that each user has his or her own computer and is running a separate instance of an application. Prior systems have not permitted customization such that the same instance of the application and the same screen can be shared. The superscript identifications in the following discussion refer to the Bibliography at the end of this disclosure.

Shared window systems[1] in the past have allowed users to share standard applications over a network. Some systems of this type are of the What You See Is What I See (WYSYWIS) type. Work on shared window systems has focused on sharing unmodified single-user applications, maintaining a networked conference, and floor control. These systems have experienced difficulties in maintaining consistent views between displays when local user preferences are honored.

Networked conference-aware systems such as window systems[2], text editors[3] and drawing tools[4] allow users at different workstations to make changes simultaneously. These systems permit some types of local user preferences[5]. One simple system of this type is Commune[4] which allows users to simultaneously draw with a stylus on the pages of a shared electronic notebook. This latter system shows the same image to all users and uses colored cursors and objects to distinguish among different users.

SharedArk[6] supports collaborative learning of physics by allowing users to simulate experiments. In this system, users move around a planar space that contains objects that they can manipulate. When users' view of the plane overlap, the views are WYSIWIS in the shared region. Each user controls a pointer, labeled with the user's name, that is visible on all conference screens. Any user can manipulate any object in his or her view. Buttons in this system can be applied to any object, and shared between users. This system also supports per-user pointers, shared buttons and objects, lightweight locking of objects, and equal status of participants.

Several systems support meetings by allowing participants, working at individual workstations, to control a large shared screen. Some use chalk-passing floor control, such as the Capture Lab[7]. Others allow simultaneous editing, such as Colab[8]. The Colab team, in reporting on the Cognoter tool, noted that simultaneous access to the screen improves brainstorming because users need not wait for others to complete an entry before making their own contribution. They also noted that shared user interfaces need to be simple, because there is little time for training in a group setting. In all of these systems, however, the number of active participants is limited by the number of machines and the participants must go to a special meeting room.

SUMMARY OF THE INVENTION

The present invention is directed to the provision of a method and apparatus for sharing a plurality of software applications on a single display while permitting substantially simultaneous input from all users, that overcomes the above discussed disadvantages of prior systems, and that permits two or more persons to share the same instance or instances of an application or applications, employing a screen common to the users and applications.

The invention is directed to the solution of the following user interface problems:
1. Interference. The system must enable users to engage in separate tasks without interfering with one another.
2. Real Estate. The screen must be managed so that collaboration is practical in limited space.

In addition, the invention is directed to the solution of the following software architecture problems:
1. Input handling. Input events from multiple devices and/or multiple users must be queued and combined to allow fine-grained sharing of application objects and to allow use of multiple applications at once, including applications that are nested inside of each other.
2. Screen update. Screen update algorithms must produce an image consistent with the editing activities of all users in all currently visible applications.

The method and apparatus of the invention thereby solves problems that may present themselves when a shared user interface is reduced to practice, as follows:
1. The software manages input streams from multiple devices at once, keeping track of which input comes from which user. Except where user actions conflict, the system allows all activities to proceed at once. To do this, the present invention represents input with a data structure referred to herein as an "Event Record", which includes information about the user and the device that originated the event. The Event Record is created with the help of two Device Ownership tables: Device To User Instance and User Instance To Device, which record the current association of users to-devices. Because one user may be moving an application while another user is pointing at it, mouse or other input device coordinates must be carefully transformed, using a mechanism called herein "event waits for pause". Long delays in input handling are prevented, using a "sick process timeout" mechanism.
2. Each application keeps track of the modes, insertion points, and style settings of each user. This is done with a data structure called a "User Instance State Record". The selected objects of each user are recorded with a "per user selection list" on each object that has been selected by any user.

3. The software must manage display updating so that all users perceive themselves as working simultaneously without interference. To ensure a constant screen display at each point in time, screen update is decoupled from the handling of application events. At the end of each event an application generates a "Paint Request Record". Paint requests are combined later and acted upon by a single process called the "System Paint Process".

In accordance with the invention, a special on-screen region, referred to herein as the "Home Area", allows each user to claim input devices, such as mice, that move cursors. The user simply clicks on a Home Area with the cursor in order to establish the association between the user represented by that Home Area and the input device. A user's Home Area also provides a natural place to position the control panel for that user's current application. These control panels are referred to herein as "Home Area menus".

In addition, the system must provide feedback to each user without confusing the other users. In accordance with the invention this result is achieved by displaying the feedback for each user in a different color, and at other times by displaying feedback for each user in a different region of the screen.

The system in accordance with the invention supports multiple users, and also supports multiple applications. Such multiple applications can be spatially nested inside one another, forming a logical hierarchy where one application may be nested inside another. Users can act within this hierarchy at any level, with different users acting at different levels.

In the system and method of the invention:
(1) Each user can have a different "current position". For instance, one user can be adding text to a first paragraph of a document, while another user adds text to the third paragraph.
(2) Each user can be operating in a different mode. For example, one user can be rotating one object while another user is creating new objects.
(3) Each user can have different style settings. For example, when one user types, the new text appears in his or her chosen color or font. Another user can create text in a different font or color.
(4) Feedback involving a particular user (e.g. what application that user is currently using, which input devices are associated with that user, what operation the user is performing, and what current modes, such as current color or current font, are in force) is displayed in a way that indicates which user that feedback is directed to.

The user interface of the present invention is comprised of three visible components, namely:
1. Home Areas for providing iconic representations of the users.
2. Applications that allow the users to perform tasks, such as editing document media.
3. Menus, which provide buttons that users can press to invoke commands.

BRIEF FIGURE DESCRIPTION

In order that the invention may be more clearly understood, it will now be disclosed in greater detail with reference to the accompanying drawings, wherein:

FIG. 4 Is a view of the screen display of a Rectangle Editor;

FIG. 5 is a view of the screen display of a Text Editor;

FIG. 6 is a screen display illustrating a method for moving a rectangle in a rectangle editor, in accordance with the invention;

FIG. 7 is a screen display illustrating resizing of a rectangle in a rectangle editor;

FIG. 8 is a screen display illustrating the simultaneous resizing of a rectangle by manipulation of two pointing devices;

FIG. 9 is a screen display illustrating the display of four editors on the screen display;

FIG. 10 is a screen display illustrating a doubly selected rectangle;

FIG. 11 is a screen display illustrating doubly selected text characters;

FIG. 12 is a screen display illustrating a Home Area with rectangle creation color feedback;

FIG. 13 is a screen display illustrating a Home Area with current font feedback;

FIG. 21 is a flow diagram illustrating the transformation of coordinates for a child editor;

DISCLOSURE OF PREFERRED EMBODIMENTS OF THE INVENTION

Figure 1:
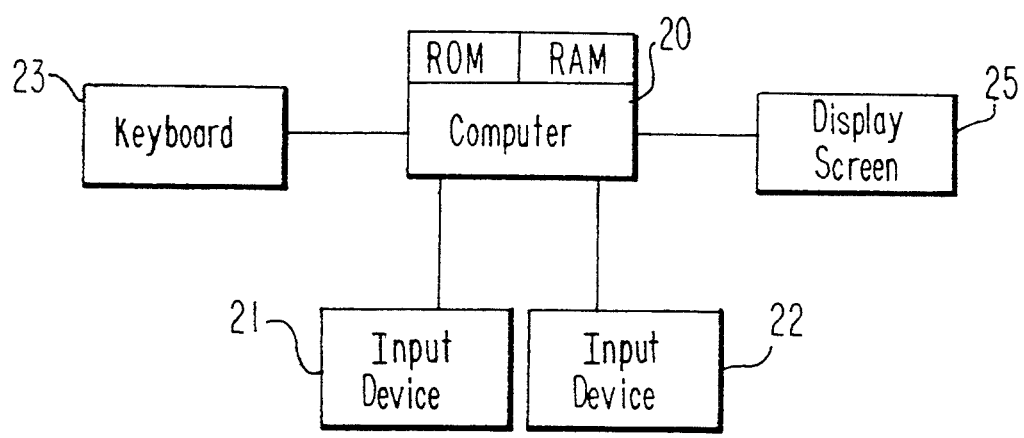
FIG. 1 is a block diagram of a system in accordance with the invention.

Referring now to the drawings, FIG. 1 is a block diagram of a basic multi-user system that includes a computer 20, which may be a conventional microcomputer having RAM and program ROM, and a plurality of input devices 21, 22, 23. The devices 21, 22 may be pointing devices, such as mouses with one or more mouse buttons, and the input device 23 may be a keyboard. It will be understood that the invention is not limited to this configuration of input devices, and that more input devices may be provided than herein illustrated. The computer system also is provided with a display screen 25 which may be a conventional computer monitor, or it may be a display device having a much larger surface area.

The system is adapted to be employed by one or more users. For example, a single user may employ the two devices 21, 22, with the system reacting to inputs from the two devices in different manners. In this case, as discussed herein the two devices have different "user instances". Alternatively, the two devices 21, 22 may be controlled by different users, with the users controlling functions on the same application or in different applications. Further input devices may be assigned to other users, or be used for other user instances.

The Display Screen

Figure 2:
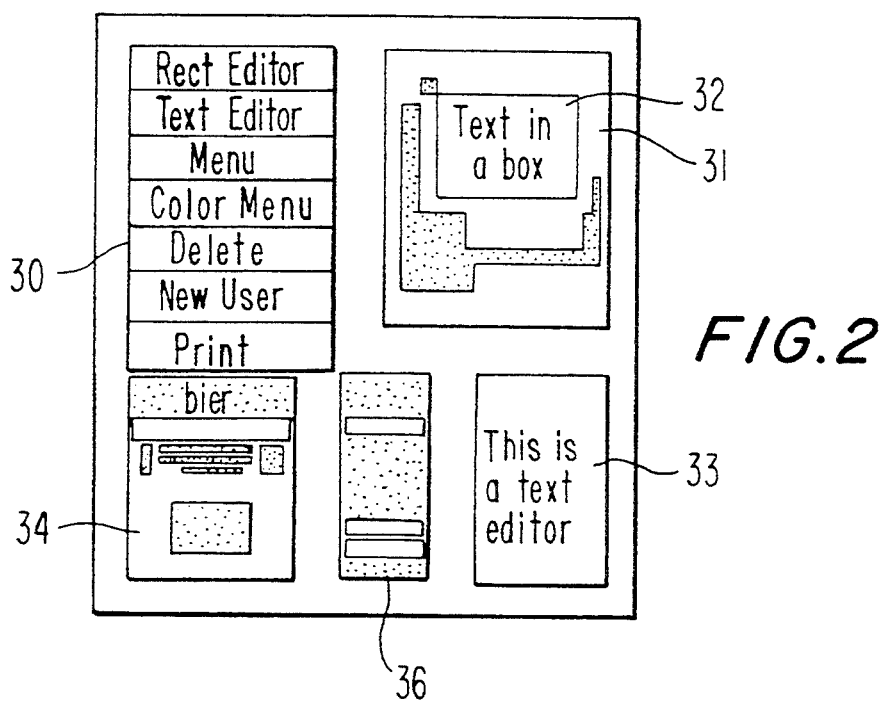
FIG. 2 is a view of a screen display in accordance with one embodiment of the invention.

A typical display that may be provided on the display screen 25, in accordance with the invention, is illustrated in FIG. 2. This screen includes a command menu 30, a rectangle editor 31 which may have a nested text editor 32, a text editor 33 and a Home Area 34. The illustrated editor screens are exemplary only, and other combinations of editor screens may be employed.

In order to invoke any of the selections of the command menu 30, the user controls his or her input device to place the cursor on the desired menu selection, and clicks or otherwise controls the device to make the selection.

The Rect Editor selection immediately turns all selected rectangles into rectangle editors, the Text Editor selection turns them into text editors, the Menu turns them into menus, the Color Menu turns them into color menus and the Delete selection deletes the selected rectangles. The New User selection creates a new Home Area for the user named by the selected text characters in the selecting user's current application. The Print selection produces a file in a page description language corresponding to the selecting user's current application.

Figure 3:
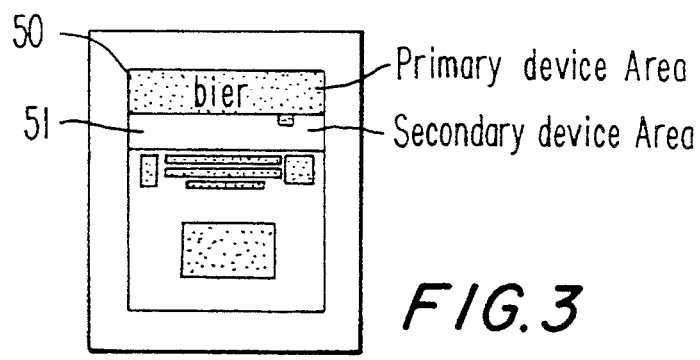
FIG. 3 is a view of the Home Area of the screen display of FIG. 2.

A separate Home Area is employed for each user participating in a session. Briefly, in order to join a session, a new user may enter his or her name into a keyboard or via a selection menu, followed by the clicking of the "New User" menu button. Other conventional techniques may of course be provided for creating a new Home Area. The system of the invention then displays a new Home Area that displays the new user's name. The Home Area of a user may appear, for example, as illustrated in FIG. 3, wherein the user's name is displayed at the top of the area. The user then moves the cursor to the name in the desired Home Area, as seen in FIG. 2, and clicks his or her mouse button or other input device. As a result, the system assigns the respective input device to that user, and any actions performed with the input device will take his or her preferences into account. The change of ownership of the input device may cause the cursor color to change to that of the user's Home Area. A user may have more than one Home Area, which may be selected in the same manner as above discussed. Extra Home Areas allow users to switch back and forth between different sets of preferences. Each Home Area is said to belong to a different "user instance".

The applications may, for example only, be rectangle editors and text editors. These applications are discussed herein only to illustrate generally the function of an application, and the invention is not limited to these specific applications. The rectangle editor permits a user to create solid colored rectangles on the screen, to select and delete groups of rectangles, and to change their size, position and color. The text editor, on the other hand, allows users to place a starting point for a line of text, to enter characters, to choose a font and color, to move a line of text, to select a sequence of characters, and to delete or change the color of selected characters.

Since the system of the invention is largely concerned with keyboardless interfaces, all editor commands, except for example text entries, are preferably activated by a pointing device such as a mouse. Command selection involves pointing to different parts (called "handles") of graphical objects on the screen for the purpose of invoking different operations.

For example, as illustrated in FIG. 4, the rectangle editor may display one or more rectangles, which may be nested. The rectangles may have a wide border or frame. The screen display of a text editor is illustrated in FIG. 5, wherein text may appear in desired fonts and colors.

In order to move a rectangle 60 (FIG. 6), in the rectangle editor, from one position to another, without changing its size, the user places his or her cursor 61 on the border of the rectangle that is to be moved, as seen in FIG. 6, clicks and holds the input device button, and drags that border in any direction, until the desired position is reached. If, on the other hand, the user desires to change the size of a rectangle 62, the user places his or her cursor 61 on a corner of the rectangle, as seen in FIG. 7, clicks and holds the input device button, and drags that corner in a direction to change the lengths of the adjacent two sides of the rectangle, to thereby increase or decrease the size of the rectangle. The arrows indicate cursor motion; they are not visible on the screen.

A user may create a new rectangle on the screen by clicking his or her input device with the cursor on the background of the rectangle editor portion of the screen. Several users may simultaneously work in an application, performing different operations and using different modes. For example, in the rectangle editor, one user may drag one rectangle while another user resizes the rectangle, or while another user performs operations on another of the rectangles. As seen in FIG. 8, two users via cursors 64, 65 may be simultaneously stretching the rectangle 66 in different directions. The rectangle editor keeps track of both operations and updates the screen to show their progress. Similarly, the users may employ the color menu 36 in order to control the color that rectangles will appear when created using the respective input device. For example, one user may choose blue as the current color for that editor while another user chooses red. The editor stores both users' modes and creates a rectangle of a color appropriate to the creating user.

Users can work simultaneously on the same object. One user can add characters to a text string while another changes the color of existing characters. Very fine-grained sharing is also possible. One user can stretch a rectangle by one corner while another stretches its opposite corner, as seen in FIG. 8, or one user can type a string of characters while another repositions the string.

The system in accordance with the invention does not have a conventional window manager. Instead, the desktop is an instance of the rectangle editor. The rectangle editor allows other editors to be nested inside of it. Each editor presents a finite window onto an "infinite" plane that contains the objects and child editors that that editor manages, which may overlap. The shape and position of this window is managed by the editor's parent. Thus, FIG. 9 shows several rectangle editors A, B, D and a text editor C. The text editor C is partly hidden by sibling editor B and by a rectangle 70, and the rectangle editor D is partly outside of the porthole of its parent editor B. Each child application occupies a display sub-region of its parent's display region. Thus, application A is the parent of child applications B and C, and application B is the parent of child application D.

Because the window system of the invention is an editor, users do not need to learn both window manager and editor operations, unlike systems where selection of an editor is different from selection within an editor. Users can also place shared widgets in the document in which they are working; widgets do not need to remain at the top level.

In single-user environments, graphical feedback is used to display aspects of system state, such as the current application mode, color, or insertion point. In accordance with the present invention, however, graphical feedback must show all of this information, as well as indicating the user to which the feedback applies. Color and spatial placement may be employed to indicate this correspondence.

Each user has a color to identify his or her cursors, insertion points, and selections. As illustrated in FIG. 10, two users have selected a rectangle, and each user's selection is shown by highlighting a corner of the rectangle frame in that user's color. Similarly, FIG. 11 shows two selections in a text string, each marked by an underline in one user's color. The overlapping part of the selection is underlined twice.

Likewise, a narrow band in the frame around a user's current editor is set to that user's color. Where several users are using the same editor, a band is colored for each user. If too many users have selected an object, such as a rectangle, text or editor, to identify them all in the frame, then only the most recent selections are shown.

A user's mode within his or her current editor is displayed in the lower half 40 of that user's Home Area, as illustrated in FIG. 12. When a user works in a rectangle editor, his or her Home Area displays that user's default color in that editor. Similarly, for a text editor, the current font and colors are illustrated in the users's Home Area, as seen at reference numeral 41 in FIG. 13.

In many desktop environments, menus are displayed once for each application window or at a unique location on the screen. For example, the Apple Macintosh pull-down menus are at the top of the screen. For a shared application on a single screen, however, menus displayed once per window take up much space and menus displayed at a fixed location only allow a single application to be used at any given time.

In accordance with the invention, however, menus can be shared among users and editors, and may be positioned anywhere on the screen, even in documents. For example, the menus illustrated in FIG. 2 can be placed in a rectangle editor regardless of its nesting level, and then applied to objects in any user's selected editor, regardless of that editor's nesting level.

Allowing people and editors to share menus reduces the screen real estate needed for control. Also, menus can be created or positioned where a user is working, avoiding user interference. Finally, users can group menus into a document to use as a customized control panel.

Shared menus work well for commands, like changing color or deleting, that apply to several editors. Some functions, however, are specific to a particular editor. Menus of these functions need only be displayed when such an editor is in use. In the system of the invention, menus for a user's selected editor are displayed in that user's Home Area. These menus can be combined with feedback that shows current modes in the selected editor. For example, as illustrated in FIG. 13, reference numeral 41, menus can display possible font choices with the user's currently selected font highlighted.

Users can simultaneously work at different levels in the application hierarchy. This capability reduces interference between users. One user can reposition or resize a document while another edits its contents. While some multi-level edits may disturb the user working at a lower lever, others work well. For example, a user may resize a rectangle editor to uncover an object beneath it without disturbing another user who is editing child rectangles that are far from the border being moved.

The user interface of the invention requires a software architecture that is unusual in several respects. It must support a hierarchy of concurrently active applications. It must handle multiple devices and users, and make links between them. Each input event must be directed to the correct application, even though other input events may be modifying the application tree. Each application must store state for all of the users who have referenced it. Finally, the applications must coordinate their screen updates to produce a consistent image.

The applications are arranged in a tree structure. The application at the root of the tree structure can have any number of child applications, each of which can have any number of children and so on. Each application has an application queue of input events and its own lightweight application process (or operating system "thread") to dequeue and execute events. When an application receives an input event, it may act on the event immediately, place it on its queue for sequenced execution or pass it to a child application.

At any moment, up to three applications are important to each user. A user's selected application will receive his or her keyboard events and his or her commands generated by clicking on a menu. If a user performs an interactive operation, such as dragging a rectangle, for example, the application in which that operation began is the mouse focus application. The mouse focus application receives mouse motion and mouse button events until the interactive operation completes, so it is possible to drag objects out of view. The most deeply nested visible application that contains a user's cursor is his or her containing application. If no interactive operation is in progress, the containing application receives all mouse motion and mouse button events.

The Processing of Input Events

Figure 14:
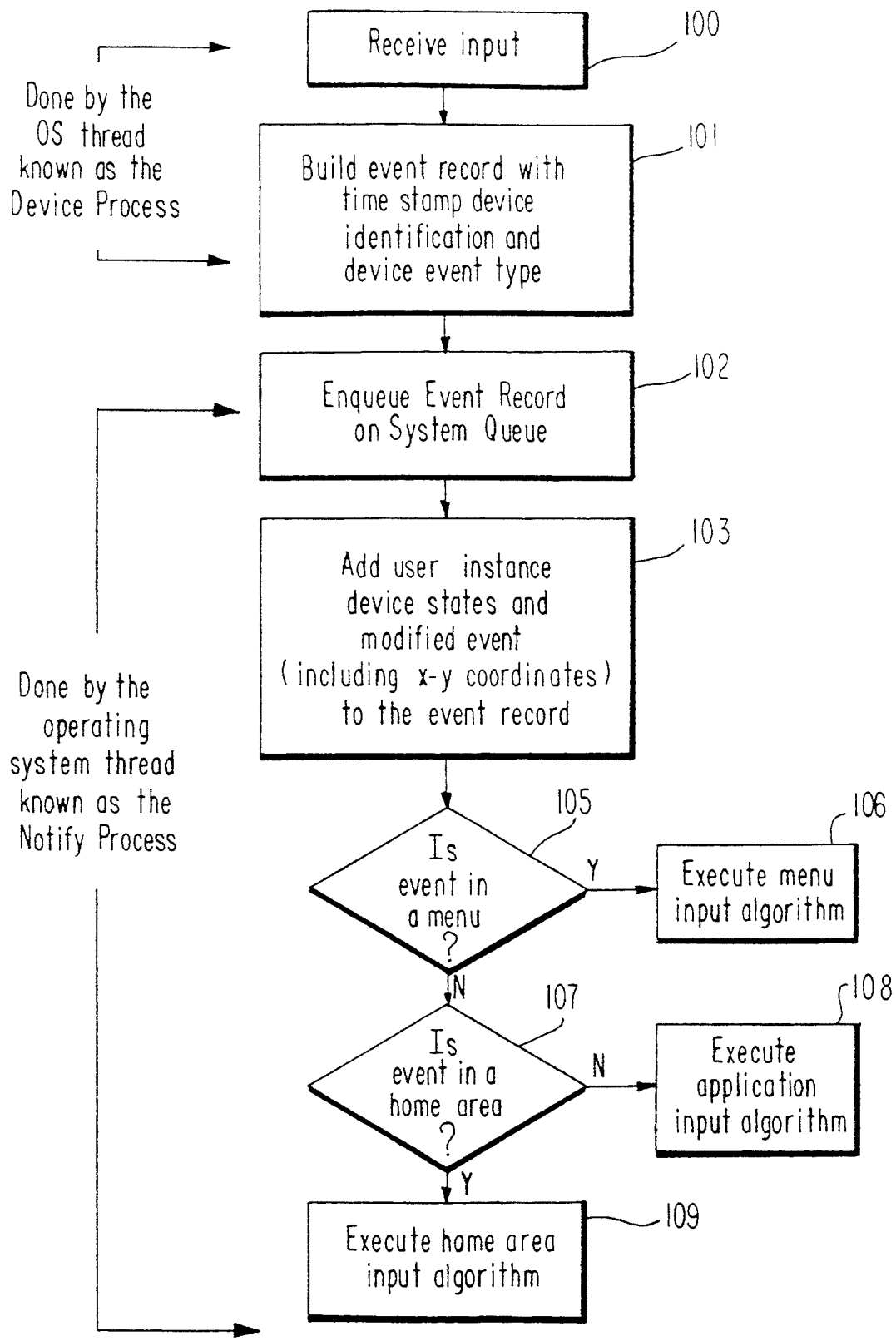
FIG. 14 is a flow diagram of the processing of an input from an external device such as a mouse.

As illustrated in the flow diagram of FIG. 14, when an input device is controlled to provide an input (block 150) to the system, i.e. to create an "event", the system initially starts building an Event Record (block 101) that includes the time of the event, the identification of the device that created the event, and the nature of the event. The nature of the event may be the pressing of a keyboard key, the movement of a mouse, the clicking of a mouse, etc. The above actions are taken by a thread called the device process. The device process then places the Event Record on the system queue (block 102).

The device process runs at a high priority so that the time-stamps will be close to real-time.

After the Event Record has been started, as above discussed, the system continues to build the Event Record, by a program running in a second thread, called the Notify Process, to include the User Instance of the input device, by referring to the association in the Device To User Instance table (block 103). The Notify Process then builds a Device States Record that represents the current state of all devices owned by the given user (e.g. whether any mouse buttons or keyboard keys are currently being held down).

If the input device is a pointing device, and the pointing device is clicked in a Home Area, then the Notify Process performs a sequence of steps that enable a user to claim the pointing device. These steps will be discussed later. It is noted, however, that only the Notify Process can modify the Device To User Instance table in the device claiming algorithm, in order to insure that the table holds consistent values.

If the device is a pointing device, the x-y coordinates of the root application are stored in the Event Record.

Figure 15:
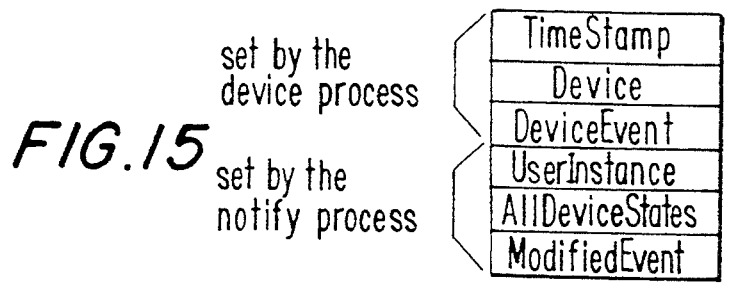
FIG. 15 illustrates the data structure of an Event Record.

FIG. 15 illustrates an Event Record built in the above described manner.

Storage is also allocated to hold local information as the event is passed between applications. This storage is called "modified event". For example, x,y coordinates will be modified to reflect the local coordinate system of each application.

The Notify Process delivers the Event Record to the proper application, menu or Home Area. For example, if it is determined that the event occurred at coordinates corresponding to a menu area, at block 105, the program proceeds to block 106 to process the menu selection, for example by creating a new application area, deleting an object, etc. If the event is not located in the menu area, then the input is tested to determine if it relates to a Home Area, at block 107. If so, the Event Record is processed by the selected Home Area input algorithm, at block 109. Otherwise, the Notify Process executes the Home Area processing, at block 109

The Home Area Algorithm

The Home Area has several areas in which the cursor may be positioned when the user clicks (e.g. depresses a button on a mouse). Clicking with the input device on the top of the Home Area causes the pointing device to be associated with that Home Area's User instance. This is called "claiming" the device.

The Home Area has several areas, which control the role of the pointing device. For example, the Home Area may have two or more sub-areas for claiming the device, such as a primary device area and a secondary device area. See FIG. 3. In this example, the input from a device that was claimed using the primary device area may control objects to be created, selected or moved, while input from a device that was claimed using the secondary device area may control the scrolling of the application in which that devices's cursor is located.

Each Home Area has a single user instance. A device belonging to that user instance can have different roles, depending upon how it was claimed.

The system records the current association of "user instances" to devices in two hash tables, called the "device ownership tables". One of these tables is the User Instance To Device table, and the other is the Device to User Instance table.

The User Instance To Device table uses the memory address of the user instance as a hash key and the memory address of a list of Device Records as the value stored in the hash table under that key. This list corresponds to all of the devices current claimed by that user instance. The hash table uses rehashing so that looking up a key is guaranteed to produce the unique value that was stored in the table associated with that key. If the hash table overflows, its size is automatically increased and keys are rehashed.

The Device To User Instance table uses the memory address of a Device Record as a key and the memory address of a User Instance as the value stored in the hash table under that key. A device can only be claimed by a single User Instance at any given time. Rehashing and resizing are employed so that the hash table does not fail. Hashs tables are used to ensure good performance.

Figure 16:
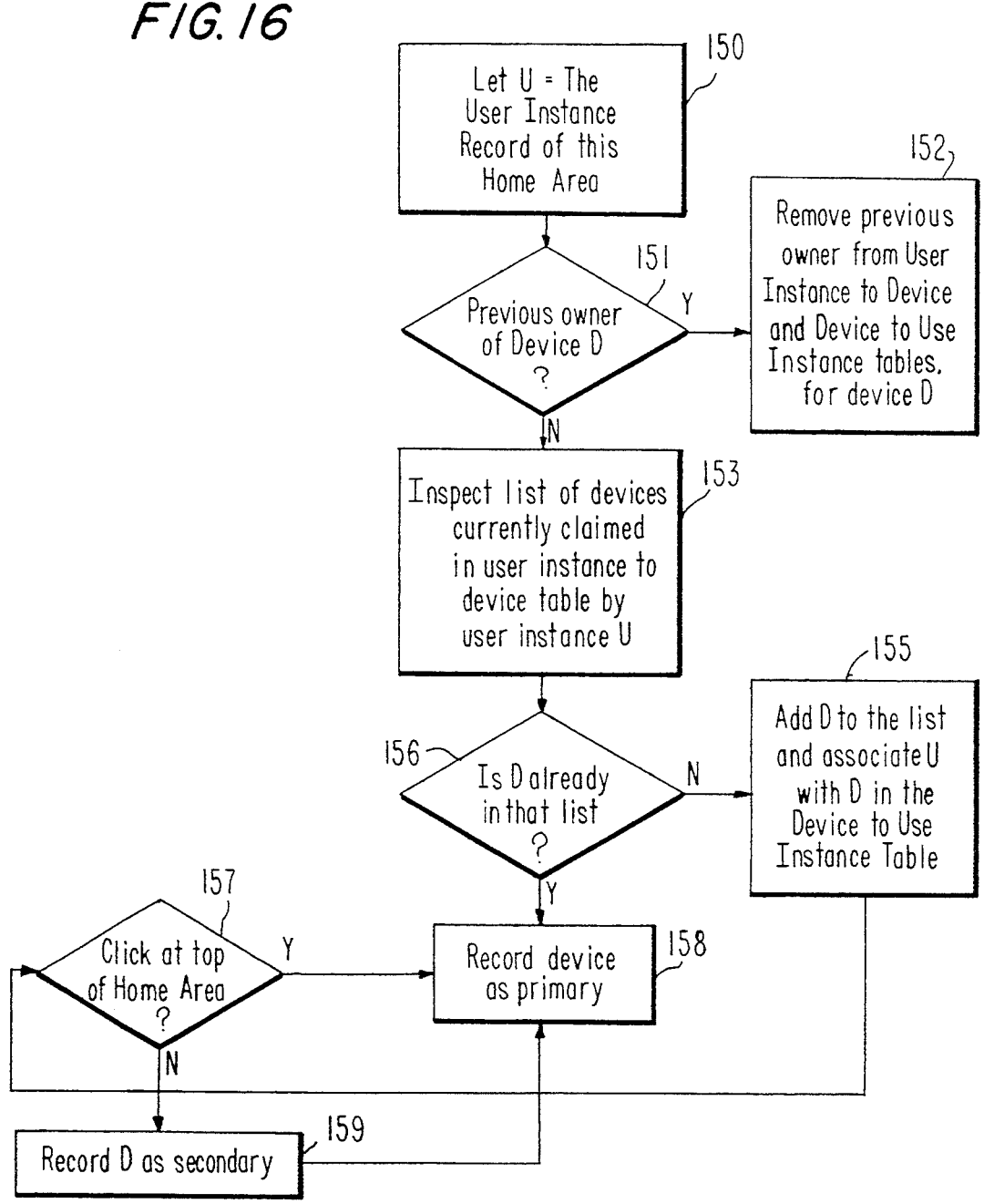
FIG. 16 is a flow diagram of processing of Event Records in the Home Area.

Referring to FIG. 16, when a user clicks a pointing device, D, on a Home Area, H, the following steps are performed:

1. The User Instance Record, U, of the Home Area is examined (block 150).
2. The pointing device, D, is looked up in the Device To User Instance table to determine if there is a previous owner of D (Block 151).
3. If there is a previous owner, and the previous owner is not user instance U, then remove D from the device list of the previous owner in the User To Device Instance table and the Device To User Instance table (block 152).
4. Obtain a list of devices currently claimed by U in the User Instance To Device Instance table associated with the Home Area (block 153).
5. Add the current pointing device to this table, if it is not already there (block 155).
6. Add the device and instance to the Device To User Instance table (block 155).
7. If the device was clicked at the top of the Home Area, record the device as a primary device. If the device had been clicked at the bottom of the Home Area, record the device as a secondary device (blocks 156, 157, 158).

If the application employs only one pointing device associated with a given user instance, the system checks to see if a pointing device is already associated with that user instance. If it is, then the previous pointing device is removed from the User Instance to Device and Device To User Instance tables, and the new pointing device is assigned in these tables.

The device claiming process, as above discussed, is performed in the Notify Process.

The Application Interface

Briefly stated, when an Event Record is removed from the system queue, the Notify Process then "walks" the tree of applications, asking each to accept the event or pass it on to a child application.

Figure 17:
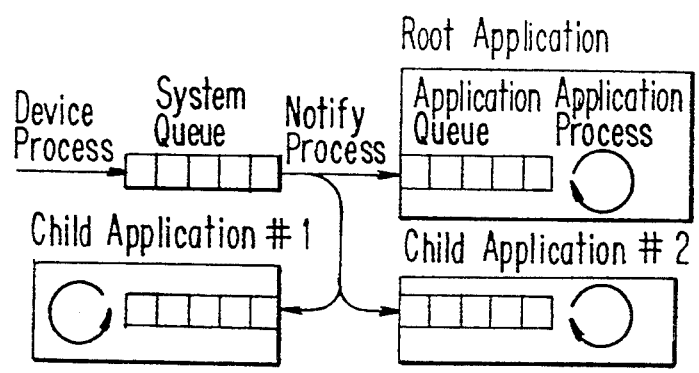
FIG. 17 is a simplified diagram illustrating the interface between the Notify Process and the shared applications.

When an application accepts an Event Record, the Notify Process performs any necessary actions, and then dequeues the record to handle the next event. This process is illustrated briefly in FIG. 17.

Only the Notify Process updates or reads the Device Ownership tables and the Device States Record. This insures that these structures are not being changed by other threads while the Notify Process is using them.

The Notify Process thus walks the tree of applications, beginning at the root, asking each application either to accept the event or to pass the event to a child. When an application accepts the event, the Notify Process performs any actions that must be done immediately, before the next event can be handled, and then dequeues the next event from the system queue and repeats this procedure.

Each application in the tree is represented by an Application Record, part of which is application-specific and accessible only to that application's application process and the rest of which is accessible to the Notify Process or the Paint Process described below. All editor records include a list of User Instance State records, one for each user instance who has referenced the application during the current session. Each User Instance State record describes the child application that is on the path to the user's selected application and the child application that is on the path to the user's mouse focus application. The system of the invention can find a user's selected application, for example, by chaining down the former path from the root application.

If a user has a mouse focus application, events are passed to the child application that lies on the path to that application. On the way, the event's position information must be translated into the receiving application's coordinate system. If the application process of some parent application, P, is busy, any child applications may be moving, so the Notify Process waits for P's application process to finish its current event before translating the coordinates. Then, if the child application is the mouse focus application, this child application accepts the event. Otherwise the Notify Process continues down the path of applications.

The Notify Process must not wait too long. If it becomes stuck, all applications stop responding to users. The invention therefore provides timeouts to avoid this problem. If the Notify Process needs to wait for more than a few seconds for an application process, it gives up, throws the event away, and marks that process as "sick". Subsequent events that must pass through a sick application are discarded until its application process is idle, whereupon it is once again marked as "healthy". While events are sometimes lost by this scheme, it is an acceptable price to pay for guaranteed responsiveness. Ideally, when several users are sharing applications, the system performance should not slow down their dialogue.

If there is no mouse focus application, the Notify Process passes mouse events to the containing application (the frontmost most deeply nested application that contains the mouse coordinates). As the event is passed down the tree, the Notify Process waits for each application's application process to be idle before translating event coordinates and passing the event to a child application. Because keyboard events do not contain coordinates, they are passed down the tree to the selected application without any waiting.

When an application receives a user event, it looks in the application-specific fields of its User Instance State record for that user to discover his or her current modes and preferences. The rectangle editor, for example, stores the user's default color for creating rectangles, the user's interactive command (dragging versus resizing a rectangle) and the last coordinates of the user's cursor that were processed during dragging. In addition, each rectangle records a list of all users who have selected it.

Applications respond to events in two phases. First, the application may request that it become the mouse focus or selected application for the user who originated the event. This is done by the Notify Process to ensure that the chains of pointers in the application hierarchy that represent the path to the mouse focus and selected applications are not changing when the Notify Process reads them. The application may then place the event on its application queue.

In the second phase, if any, the application process chooses an event from its corresponding application queue and executes it. To choose an event, it inspects all the queued events. It performs the oldest mandatory event, or if there are no mandatory events, it executes the most recent optional events (e.g., motions during rubber-banding are optional), skipping older ones. This helps the application handle large volumes of input.

Applications place incoming events from all users on the same queue, so it is necessary to decide which user's event to respond to first. Mandatory events are handled in the order in which they are received, regardless of user. For optional events, the application selects the user who has been least recently served, so the application feels equally responsive to all users.

Any application process can make changes that require the screen to be refreshed. Objects and applications can overlap so refreshing the screen for one application may require the cooperation of both parent and sibling applications. It is possible to allow each application process to walk the entire application tree as needed to update the screen after a change, but this might allow one process to read application data while another application process is modifying it.

Instead, in accordance with the invention, when an application wishes to paint, it creates a Paint Request record which includes (in the coordinates of the application) a rectangle that bounds the region to be repainted. The application notifies the system that it would like to paint and then turns off its application process and waits. The system asks all application processes to pause and waits until they have all stopped, and then the system Paint Process walks the tree of applications to determine a rectangle or rectangles bounding all the regions that have changed. It then walks the tree again asking each application in turn to repaint itself within these rectangles. The resulting paint actions are double-buffered so that they appear to the user all at once, enhancing the perception of simultaneous motion. Once all applications have finished painting, their application processes are reactivated.

Figure 18:
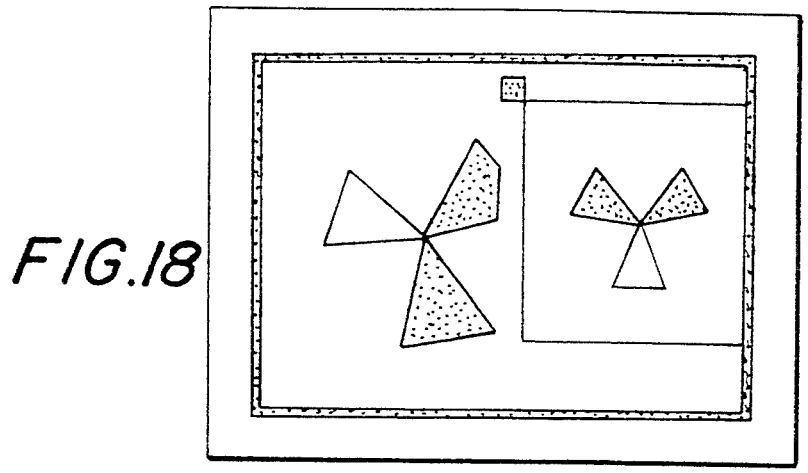
FIG. 18 is a simplified illustration showing the updating of a screen, in accordance with the invention.

FIG. 18 illustrates a screen update procedure. An application program was produced that constantly sends Paint Requests to draw a rotating animation. In this figure, when both windmills are painting at once, the system will update the screen all at once, using the rectangle that bounds both of the rectangles, as shown by the heavy black lines.

Structures of the Applications

Figure 19:
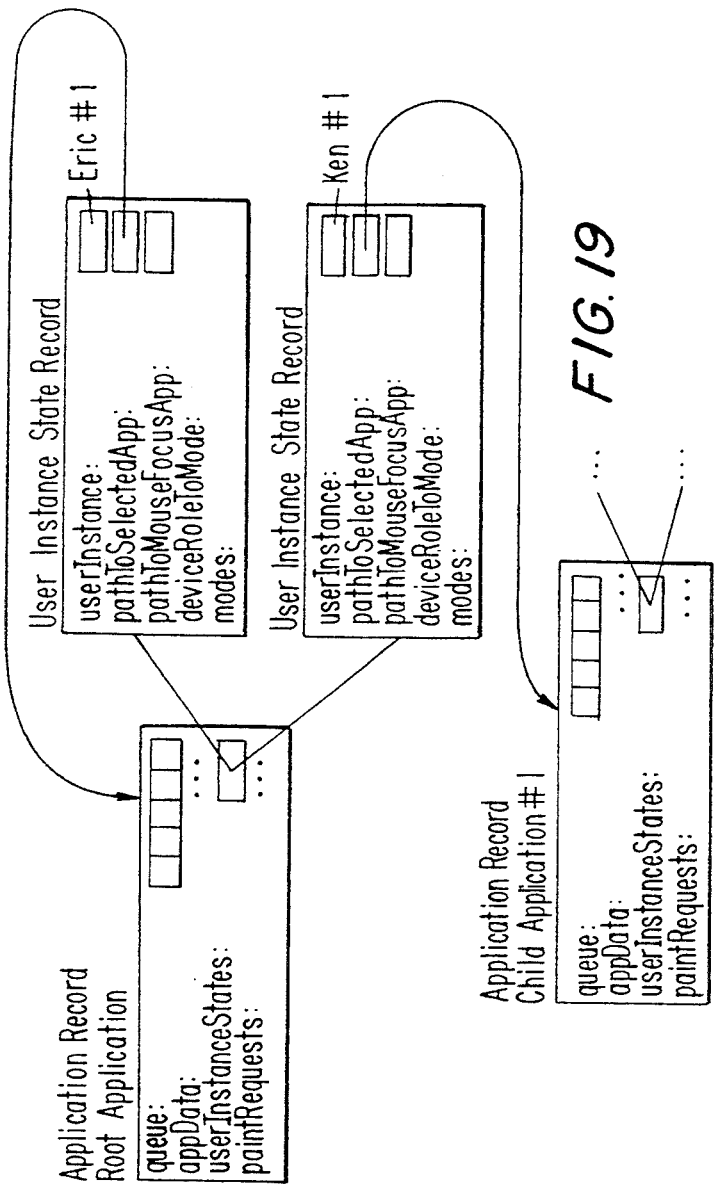
FIG. 19 is a diagram illustrating the structure of an application.

As illustrated in FIG. 19, each application has an Application Record, part of which (the appData) is editor specific, and accessible only to that editor's Application Process. The next two fields of the Application Record (the User Instance State Records and the queue) are accessible to the Notify Process. Finally, the Paint Requests are accessible to the application process and to the System Paint Process. The Application Record has a separate User Instance State Record for each user who has referenced the application during the current session.

Figure 20:
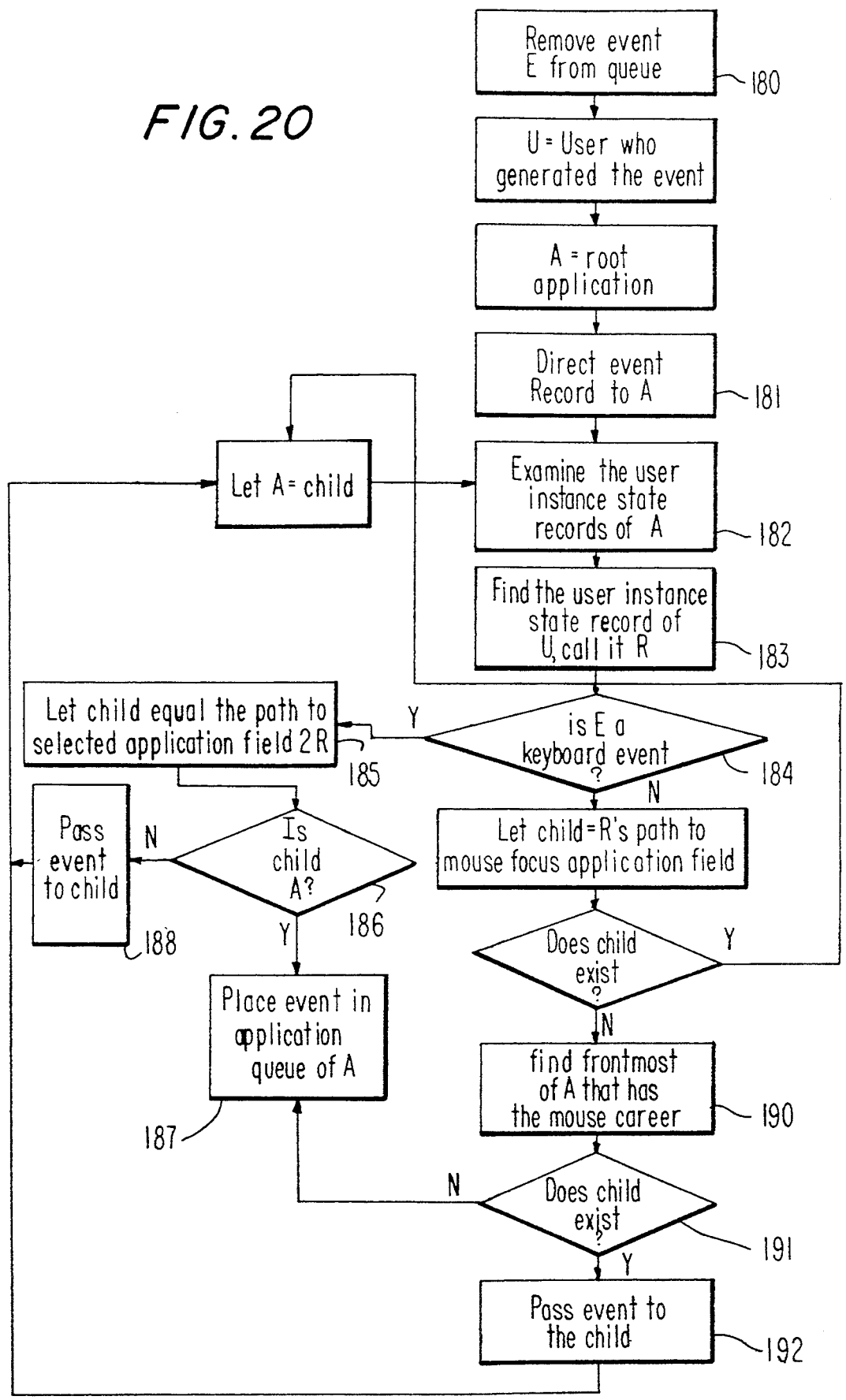
FIG. 20 is a flow diagram illustrating the handling of an Event Record by an application.

Each User Instance State Record describes the child application that is on the path to the user's selected application (and the child application that is on the path (in the tree of applications) to the user's mouse editor.) As seen in FIG. 20, the Notify Process removes an Event Record from the queue (block 180) and directs it to the root application (block 181). When an application, A, receives an input event, it uses the Application Record and the User Instance to determine if it should queue and execute the event, or whether a child application should receive the input event, in accordance with an algorithm:

1. Examine the User Instance State Records for application A (block 182).
2. From this Record find the User Instance State Record that corresponds to the user instance that produced the event (block 183).
3. If the event is a keyboard event (block 184), examine the Path to Selected Editor field of the User Instance State Record (block 185). If the path points to application A (block 186), place the event on the queue of application A (block 187). Otherwise, if the Path to Selected Editor points to a child application, pass the event to that child (block 188).
4. Otherwise, if the event is from a pointing device (e.g. upon movement of a mouse or pressing of a mouse button):
    If the Path To Mouse Focus Application is not empty, pass the event to the application recorded in this field for processing. Otherwise:
       Determine the frontmost child application that contains the mouse cursor (block 190). If there is such an application (block 191), pass the event to this application (block 192).
    Otherwise:
       Place the event on the queue of application A (block 193).

Each user has one or more distinct User Instance State Records, so that events may be delivered to different applications, depending upon which user instance is producing the event.

Coordinate Transformation

When an event is passed to a child application, the two dimensional coordinates (x,y) of the event must be translated into the coordinate system of the child application. In a multi-user system, however, one user may be moving the child application at the same time that another user is pointing to it. In order to reliably transform event coordinates, the system must determine a single consistent position of the child application with respect to its parent. In accordance with the invention, this is effected by the use of a cooperation between the application processes and the Notify Process.

When an event directed to a child application is created by a pointing device, (block 200 in FIG. 21), the system asks the parent application to pause in its current activity. When the parent application has paused, the coordinates of the input event are translated for the child application. This translation is effected as follows, with reference to FIG. 21:

1. If the parent application, A, is idle (block 201), and its queue is also empty, no further action need be taken since the coordinate transformation algorithm is being performed at that time by the Notify Process (block 202), which is the only process that can add events to A's queue. The Notify Process accordingly transforms the coordinates, and records the A as being "healthy" (block 204).
2. If the parent application has paused in response to a request thereto to pause (block 205), (e.g., at the request of a Paint Process), but the queue is not empty, a Continue OK flag of the parent editor process is set to FALSE (block 206), preventing any other process from restarting A. The coordinates for the child editor are then transformed (block 207). The Continue OK flag is then set to TRUE (block 208), allowing the process that paused A to continue A when appropriate. (block 209).
3. Otherwise, if A is currently handling an event, a test is made to see if A is "healthy" or "sick". If A is recorded to be sick, the event is discarded and the system proceeds to handle the next event. If, on the other hand, A is recorded to be healthy, a request is made for it to stop as soon as it has completed the event that is currently being handled. If A stops within a given time, e.g., one second, the coordinates are translated from A to C and then the processing by the parent editor is restarted. If A does not stop within the given time, the input is being held for too long a time, the queue of the parent editor is recorded as being sick, and the event is discarded and the system proceeds to handle the next event.

The above algorithm guarantees that no application will hold up the processing of input events indefinitely. If an application takes too long to process an input event, it is "marked" as being sick, and future input events to that application are discarded until the application has caught up with the work on its queue. In the meantime, the user can interact with other applications that are not sick.

The Event Delivery Algorithm also requires the determination of the frontmost child application that contains the mouse cursor. Correct determination of that child also requires having a consistent view of the parent application. This can also be done using the Coordinate Transformation Algorithm, where the decision of which child is under the mouse coordinates is determined immediately prior to transforming the coordinates to the coordinate system of that child.

Updating of the Screen

As user events are processed, applications must update the screen to reflect changes in state. Screen updates from multiple applications must be coordinated to produce a sequence of screen images each of which is consistent with itself.

Figure 23:
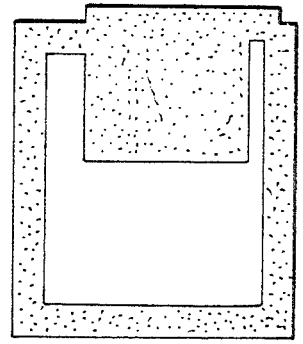
FIG. 23 illustrates the results of the instructions of FIG. 22, in the absence of the system of the invention.
Figure 22:
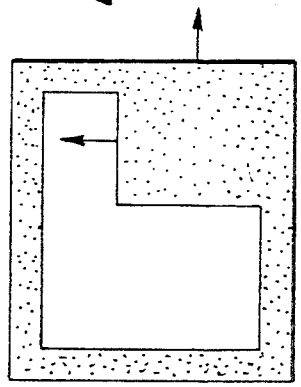
FIG. 22 illustrates a rectangle editor in which a rectangle contained in that editor and the editor itself are being simultaneously repositioned.

Referring to FIG. 22, a condition is depicted wherein one user is attempting to drag a rectangle of a child editor in the upward direction, while another user is attempting to drag a rectangle of the editor that is the parent editor of this child, where said second rectangle includes the child editor rectangle, in a rightward direction. If the system were to update the region of change, taking into account the latest position of the child editor, an inconsistent display would appear, as illustrated in FIG. 23. In accordance with the invention, however, the system momentarily pauses all applications, updates all portions of the screen that have changed since the last screen update, and then allows all applications to continue. This algorithm requires the cooperation of all of the applications in an algorithm referred to herein as the Paint Algorithm.

The Paint Algorithms

Figure 24:
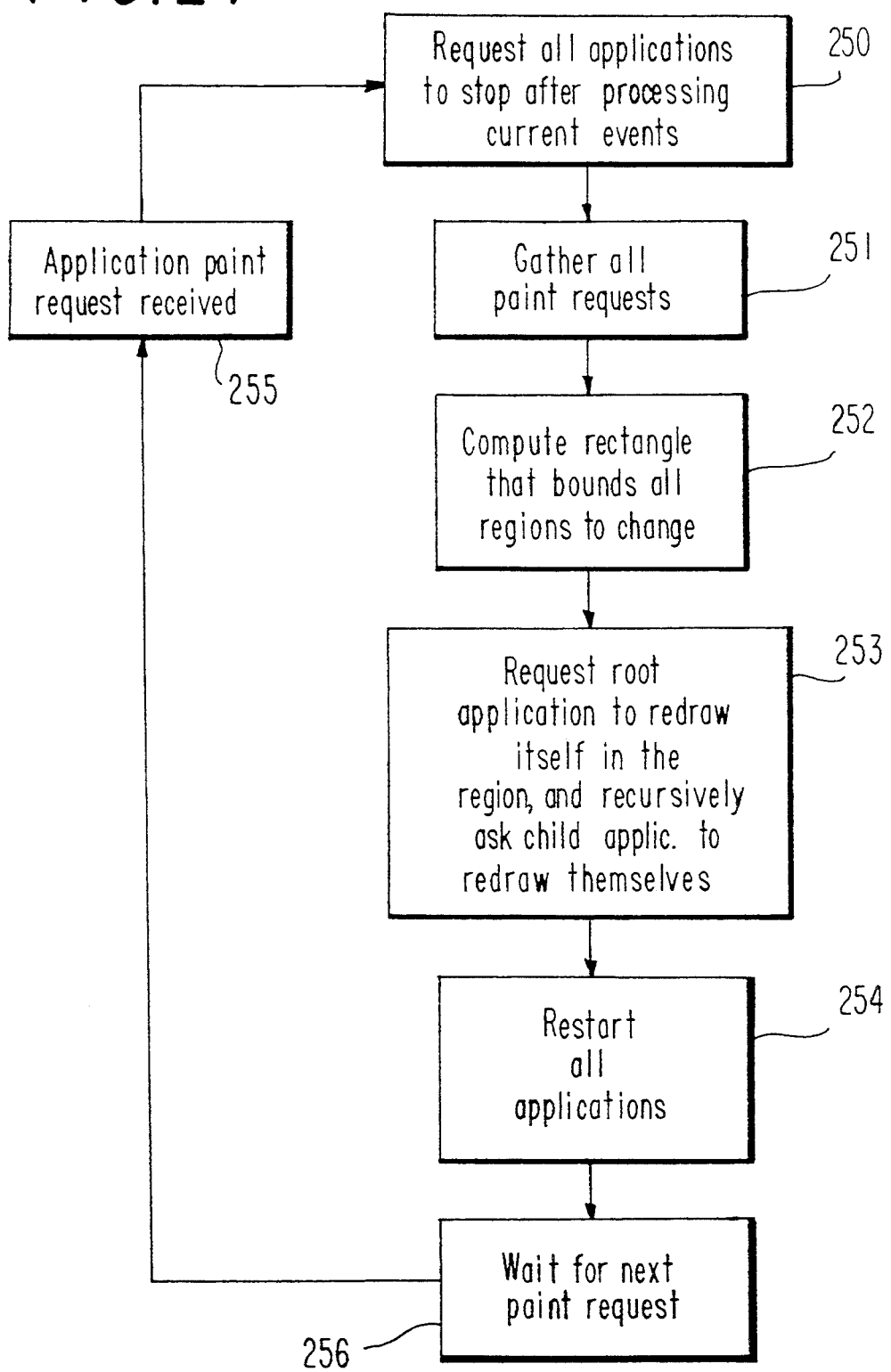
FIG. 24 is a flow diagram of a Paint Process in accordance with the invention.
Figure 25:
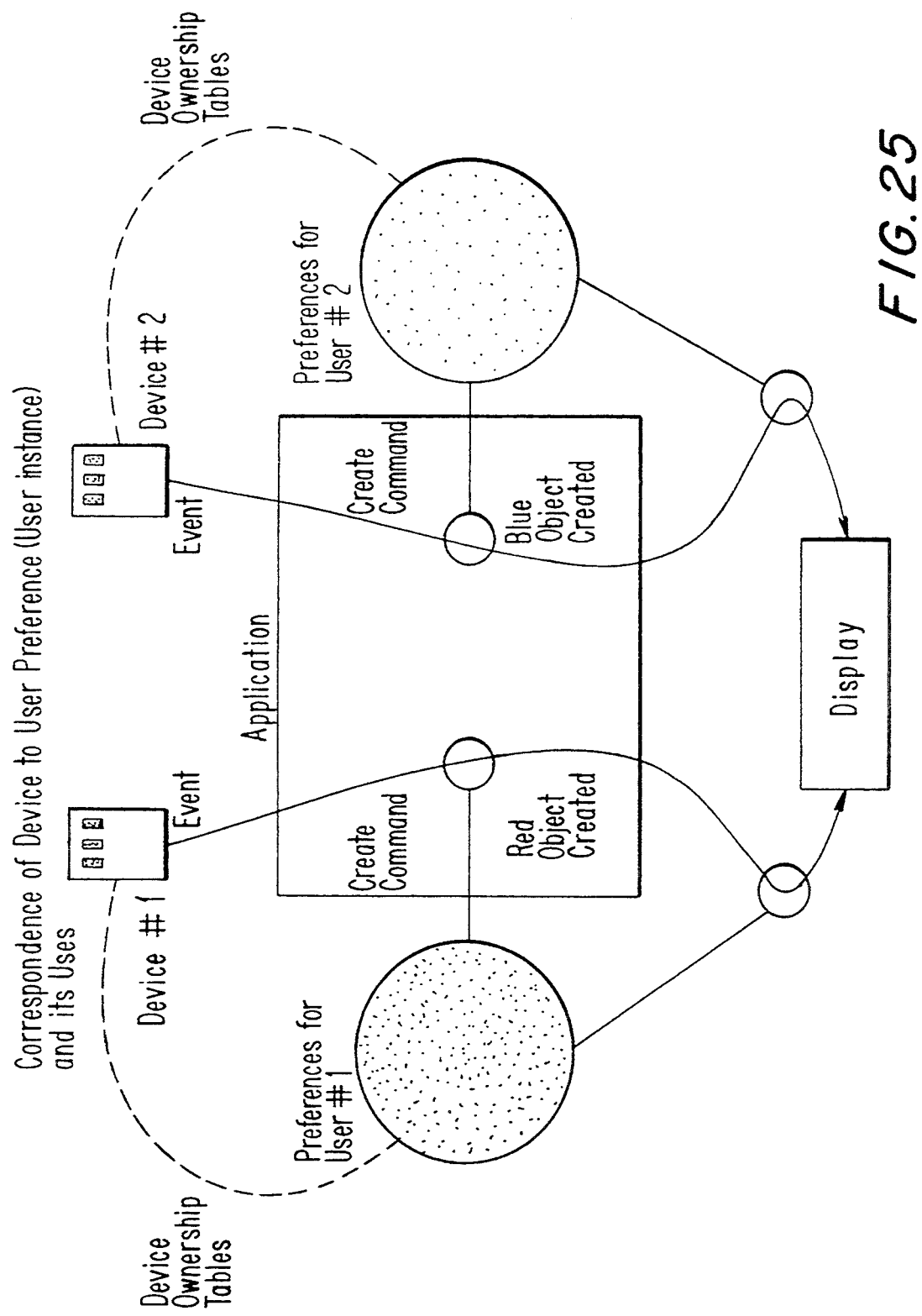
FIG. 25 illustrates the involvement of user preferences in the processing of input events from two different users, both when an application is constructing a command and when the display is being updated.
Figure 26:
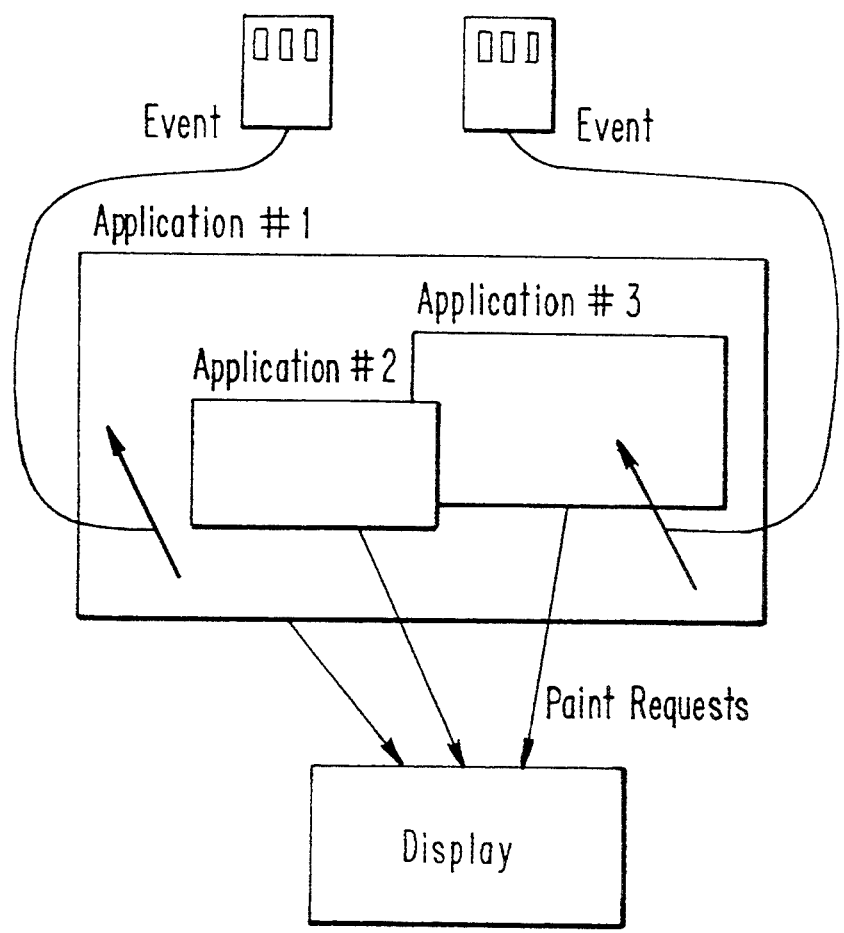
FIG. 26 illustrates three applications that are receiving input from two input devices and updating a single display.

When an application wishes to redraw the screen display, it does not do so immediately, but instead creates a data structure, representing the desired change, and stores this data structure in the "Paint Requests" field of its Application Record, and then notifies the system that it wishes to update the screen. The Paint Process (an operating system thread) executes the following algorithm, with reference to FIG. 24:

1. The Paint Process requests that all applications stop their activities after finishing the processing of their current events (block 250).
2. When all of the applications have stopped, the Paint Process walks the entire tree of applications, gathering all Paint Requests. (block 251). Each Paint Request describes a specific region of the screen to modify.
3. The Paint Process responds to these requests by computing a rectangle that bounds all of the regions to change (block 252).
4. The Paint Process then requests the root application to redraw itself in the computed rectangle of step 3 (block 253). The root application proceeds to redraw those of its objects that are in this region, in back-to-front order. In order to redraw an object that contains a child application, it recursively asks the child application to repaint itself within the region of change. This process continues until all applications that are included in the region of change have redrawn themselves in the correct order.
5. The Paint Process then requests all applications to restart the processing of events (block 254).
6. The Paint Process then returns to an idle state, waiting for the next Paint Request.

In general, in accordance with the Paint algorithm, the Paint Process can compute more than one regions of change, if it is faster to update several small regions rather than one large region. Applications whose size, shape and appearance are unchanged can be repainted from a saved raster image of their previous appearance. Applications and application objects that are obscured by other objects need not be repainted at all.

While the invention has been disclosed and described with reference to a limited number of embodiments, it will be apparent that variations and modifications may be made therein, and it is therefore the aim of the present invention to cover each such variation and modification as falls within the true spirit and scope of the invention.

The following paper is hereby incorporated by reference: Eric A. Bier et al., Nov. 10, 1991 "MMM: A User Interface Architecture for Shared Editors on a Single Screen," *Proceedings of the ACM Symposium on User Interface Software and Technology*, Nov. 11–13, 1991, p. 79. In the event of any inconsistencies between the foregoing description and the above paper, the paper shall prevail.

What is claimed is:

1. A method for operating a multi-user collaborative computer system, said computer system comprising:

(a) a work station including a computer and having a single display, storage means for storing multiple applications including parent and child applications and data, each parent application being capable of having one or more child applications, each application having an application input queue for input events waiting to be processed by said application, each application being capable of spawning a process, means for executing one or more of the applications, means for presenting on the single display objects created by the applications, and a common system queue, each parent application when executing being capable of occupying a region of the display, a child application when executing occupying a sub-region of the region of the display occupied by its parent application, (b) a plurality of user-controlled input devices each connected to the workstation, each input device being under control of a user, each input device in cooperation with the computer being capable of generating input events that are targeted by the user at selected ones of said applications, said selected ones of said applications when targeted being the focus application of the input device, said input events when executed by the focus application being capable of generating new objects for presenting on the display or of modifying objects so as to change their size, orientation, or appearance on the display, said plurality of input devices being capable of generating simultaneous or sequential input events;

(c) means connected to the workstation for detecting when input events are generated and for passing the generated input events to the common system queue;

said method being implemented by the computer and comprising the steps:

(i) each user, operating an input device, operating the input device to establish the user's ownership of that particular input device, (ii) said users operating their input devices to generate targeting input events targeted at certain of said applications, and detecting and passing said targeting input events to said system queue, (iii) when a targeting input event in the system queue is targeted at a first child application, waiting for the parent application of the targeted first child application to complete any current action and then halting all processing of events by the parent application before passing the targeting event to the input queue of the targeted first child application, (iv) thereafter placing the received targeting input event in the input queue of the first child application, (v) restarting the parent application of the targeted first child application after said targeting input event has been placed in the input queue of the targeted first child application, (vi) continuing to pass targeting input events to the targeted applications while the system queue contains any such events.

2. The method of claim 1, further comprising the workstation having means for storing user preferences for displaying objects and executing operating programs; further comprising the computer-implemented steps:

(vii) associating each input event with an input device owned by a particular user, (viii) modifying the display or the execution of an application in responding to the input event of step (vii) in accordance with the preferences of that particular user.

3. The method of claim 1, wherein multiple applications in response to input events must update the display by repainting a particular display region, comprising the computer-implemented steps:

(vii) determining which of said applications need to repaint a display region, (viii) determining the display region to be repainted for the applications determined in step (vii), (ix) pausing each of said applications determined in step (vii) upon completing their current action, (xi) while all of said applications determined in step (vii) are paused, repainting all of the displayed regions needing repainting in the display region determined in step (viii), (x) restarting all of the paused applications after step (ix) has been completed.

4. The method of claim 1, further comprising in the computer system means for moving a child application sub-region within the display region of its parent application, each input event having a current position in the display, the parent application display region having a current display position and the child application sub-region having a current display position, and means to compute the effect of each input event targeted at the child application with respect to the current relative display positions of the input event, parent application and child application, further comprising the computer-implemented step of tracking movements of the child application sub-region with respect to its parent's display region.

5. The method of claim 4, further comprising the steps of one user generating input events for moving the display sub-region of a child application and another user is substantially simultaneously generating input events targeted at the same child application.

6. The method of claim 4, wherein the computer generates for each input device a cursor on the display, the user targeting an input event for a particular application by locating the cursor over the display region of the application.

7. The method of claim 4, wherein the computer stores in memory for each executing parent application a data-resident representation of the application including a data-resident representation of any executing child applications, execution of input events by the parent application or its child application modifying their respective data-representation.

8. The method of claim 1, wherein the computer generates for each input device a cursor on the display, the user targeting an input event for a focus application by locating the cursor over the display region of the application.

9. The method of claim 1, wherein the computer stores in memory for each executing parent application a data-resident representation of the application including a data-resident representation of any executing child applications, execution of input events by the parent application or its child application modifying their respective data-representation.

* * * * *